United States Patent [19]

Shuleshko

[11] 3,723,855

[45] Mar. 27, 1973

[54] SYSTEM HAVING FAST PLURAL HIGH VOLTAGE SWITCHING

[75] Inventor: Paul Shuleshko, Rochester, N.Y.

[73] Assignee: Sybron Corporation, Rochester, N.Y.

[22] Filed: Aug. 16, 1971

[21] Appl. No.: 171,983

[52] U.S. Cl. ........................323/21, 307/77, 307/85, 315/27 TD, 315/31 TV, 321/DIG. 1, 321/27 R, 323/25

[51] Int. Cl. ................................................G05f 1/56

[58] Field of Search ....321/DIG. 1, 9 R, 27 R; 307/4, 307/5, 6, 44, 63, 71, 75, 77, 85, 311; 315/27 TD, 30, 31, 31 TV; 323/23, 24, 25, 21; 250/206; 313/92 PF

[56] References Cited

UNITED STATES PATENTS

| | | | |
|---|---|---|---|
| 3,217,233 | 11/1965 | Drusch | 321/27 R |
| 3,600,598 | 8/1971 | Foerster | 307/44 X |
| 3,571,604 | 3/1971 | LaPorta | 323/23 X |
| 3,579,096 | 5/1971 | Buchanan, Jr. | 323/24 X |
| 3,330,990 | 7/1967 | Guillette | 313/92 PF |
| 3,360,713 | 12/1967 | Howell | 323/21 |

*Primary Examiner*—Gerald Goldberg
*Attorney*—Theodore B. Roessel

[57] ABSTRACT

High voltage DC sources each having a switch for connecting and disconnecting its poles and a switch for connecting and disconnecting one of its poles from itself. Each switch of the former sort is connected in series with the rest thereof, and is open or closed depending respectively whether or not the voltage of the corresponding source is to be utilized. Each switch of the latter type is closed or open depending on, respectively, whether or not the voltage of the corresponding switch is to be utilized.

Each source has a zener diode string permanently connected across it. Each switch, likewise, has a diode string connected across it, and is composed of a series of switching transistors, each of which has a diode of the latter diode string connected between its emitter and collector electrodes. The net effect of the diodes is to provide for fast change in voltage level under all conditions.

The switching transistors are opto-electronically controlled for adaptation to use in systems like multicolor graphic display systems using beam penetration tubes wherein voltage level switching at high repetition and slewing rates is required, along with good isolation of the high voltage from other potentials, close to ground, in the system.

12 Claims, 1 Drawing Figure

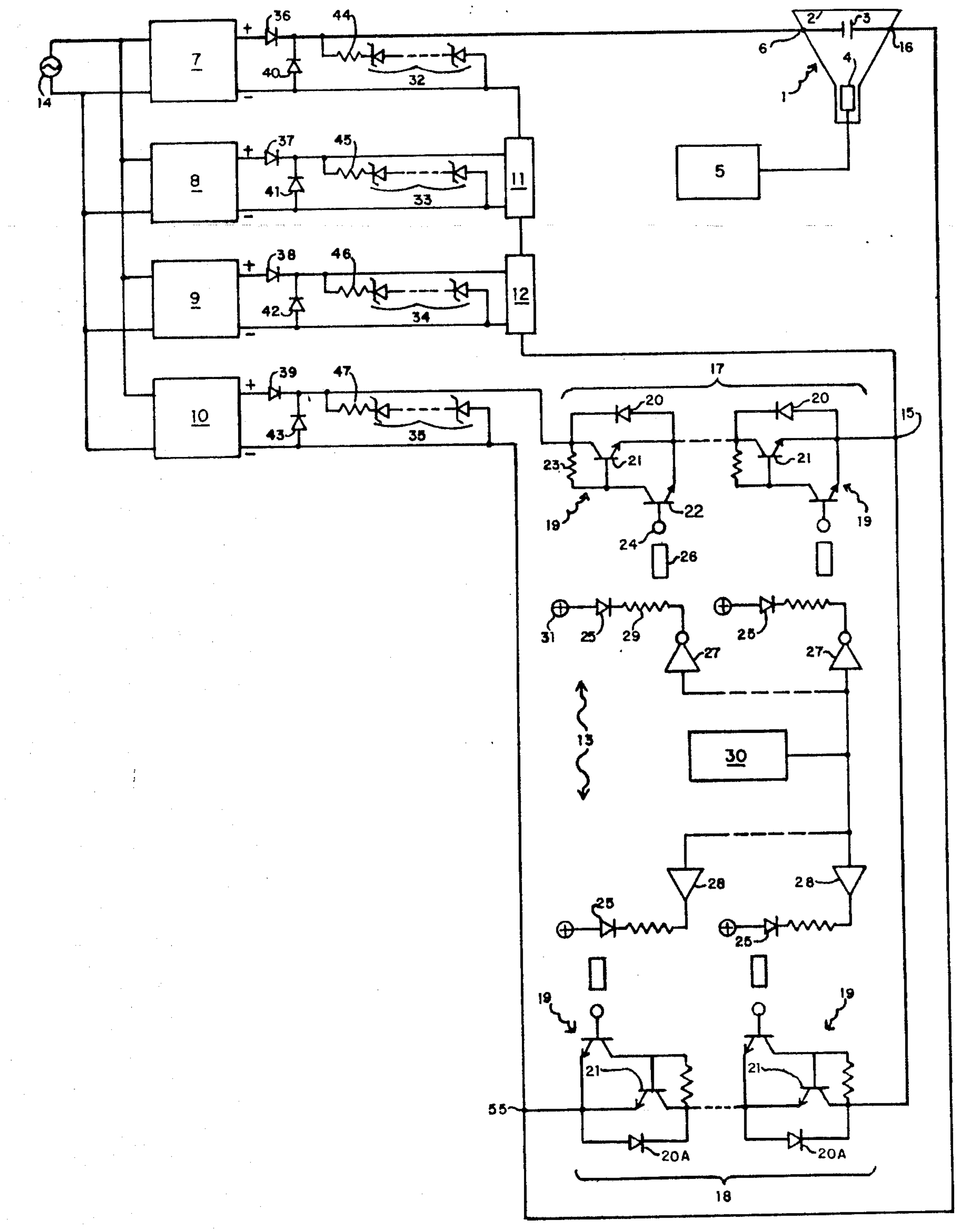
7
8
9
10
11
12
5
30
1
2
3
4
6
14
15
16
17
18
19
20
20A
21
22
23
24
25
26
27
28
29
31
32
33
34
35
36
37
38
39
40
41
42
43
44
45
46
47
55

SYSTEM HAVING FAST PLURAL HIGH VOLTAGE SWITCHING

FIELD OF THE INVENTION

In multi-color graphic display systems having multi-color light emitting panels, such as the phosphor coated viewing faces of beam penetration tubes, several levels of high DC voltage are required, and it is desired to switch voltage levels at high slewing and repetition rates. Further, control of such switching is ultimately at a potential close to ground, as compared to the levels being switched, so for safety and other reasons isolation is required between the high voltage and the means providing level control therefore.

THE PRIOR ART

It is known to switch high voltages mechanically, electronically, magnetically, etc., with one degree or another of isolation for the means controlling the switching. Likewise, switched operation for generating a variety of colors from the viewing face of a beam penetration cathode ray tube is known.

SUMMARY OF THE INVENTION

In the present invention, a plurality of mutually isolated sources of high DC voltage are connected in series with each other by switch means providing for connecting together the poles of any given source, and for disconnecting one of the said poles from such source when the said poles are connected together. Conversely, the switch means can also provide for disconnecting the poles from each other, and for connecting the said one of said poles to such source. Certain of the said sources each have such switch means with the several said switch means being connected together in series, in respect of their function of connecting and disconnecting source poles together. In this way, the several switch means provide for switching the sources having them in and out of a series relationship.

Each switch means includes two switches, one of which interconnects the poles of the corresponding source and the other of which connects one such pole to that source.

The switches are transistors, or the like, optically controlled for isolation, and provide high repetition and slewing rates particularly suited for switching the high voltage across the phosphor coating of a beam penetration cathode ray tube used to graphically display valves and qualitative aspects of process variables.

When a load of this sort is switched from a higher level to a lower level, it discharges into the voltage sources, so diodes are provided to conduct the resulting reverse current around switches connecting poles to their sources, and zener diodes are provided across the sources which breakdown to conduct the reverse current around the sources. Diodes are also provided to conduct normal current flow around the switches which interconnect poles. The diodes and transistors collectively assure that whatever current flows as a result of switching levels, namely, to or from the load, always has a DC return path, and it is in fact the main object of this invention to provide a switch means having this property whether taken alone or in a system including several sources and several such switch means.

BRIEF DESCRIPTION OF THE DRAWING

The sole FIGURE of drawing is a schematic diagram of a system for switching high voltage on a graphic display panel such as the phosphor coating on the face plate of a beam penetration cathode ray tube.

In the FIGURE, a cathode ray tube 1 provides a display panel in the form of its viewing face 2 having a phosphor coating thereon (not shown, as such, but represented by a capacitor 3, since it is essentially capacitative in nature). For example, it may be supposed that the coating has a green and red component, and is of the sort that if voltages in the range of 6 to 12 KV DC are applied thereto, the electron beam from the "gun" 4 of the tube will cause the coating to emit red, orange, yellow or green light, wherever the beam strikes the coating, depending on the voltage across the phosphor, namely, at the terminals 6 and 16 between which capacitor 3 is shown to be connected. Typically, the electron beam will be positioned on the coating by suitable circuitry for producing a graphic display of one sort or another on the viewing face 2, such circuitry being represented merely by box 5, as its specific nature is not relevant to the purposes of the present invention.

According to the invention, the voltage across terminals 6 and 16 is provided by a high voltage supply consisting of high voltage sources 7, 8, 9 and 10, providing 6, 2, 2 and 2 KV DC, respectively, for example, depending on the states of switch means 11, 12, and 13. Sources 7 through 10 may be of suitable variety capable of converting the relatively low voltage, say 117 VAC of a low voltage source 14 connected to the input terminals of the sources 7 through 10, to the several thousand volt values enumerated above. For purposes of the present invention, the sources 7 through 10 should be well isolated from each other in the sense that they give the effect of being, say, batteries having the enumerated DC voltages, and not otherwise connected to each other, save through switch means 11, 12 and 13. Typically, known converter circuits will give this effect by having one or another kind of AC-only coupling somewhere between source input and output.

As the switch means 11, 12 and 13 are identical, only switch means 13 is shown in detail. Switch means 13 is essentially two switches, 17 and 18. Switches 17 and 18 in turn are identical to each other and composed of elemental transistor switches 19, connected in series. Switches 19 are also identical to each other, so it suffices, therefore, to explain only a single elemental switch 19, although for heuristic convenience, the exact counterparts of diodes 20 of switch 17 are designated 20A in the switch 18.

Switch 19 includes diode 20, transistor 21, phototransistor 22, resistor 23, phototransistor 22 having a base element 24, which, if the radiation incident thereon be sufficient, conducts between its collector and emitter, so resistor 23 is chosen to bias transistor 21 on under this condition. Each of switches 17 and 18 will have as many transistors 21 and corresponding diodes 20 or 20A therein as are needed to withstand the voltage across it. At present, transistors are available, the collector-emitter breakdown voltages of which are high enough that six transistors 21, per switch 17 or 18, suffice in the present example.

In order to turn off transistors 21, e.g., open switch 18, the elements 24 are irradiated by photoemissive diodes 25, preferably via fiber optical elements 26, or the like, for improved electrical isolation. The diodes 25 are energized by amplifiers 27 and 28, via resistors 29, amplifiers 27 being non-inverting and amplifiers 28 being inverting, and having their inputs connected to a common control means 30 operable to emit either a negative pulse or a positive pulse. It will be seen that if means 30 goes negative, current will flow from the B+ supplies 31 through those diodes and resistors connected to amplifiers 27, but not through those connected to amplifier 28, since the outputs of the latter go positive. If means 30 goes positive, the opposite will obviously happen. The resistors 29 set the levels of light-emission from diodes 25, which level, naturally, is chosen to be high enough to turn on the phototransistors 24 whenever control means 30 makes the outputs of the corresponding amplifiers negative.

The terminals 15 and 55 represent the positive and negative poles of source 10. Hence it will be seen that the positive pole 15 is connected to the positive side of the source 10 by switch 17, whereas the positive and negative poles 15 and 55 of source 10 are interconnected by switch 18. From what has been said before in describing the operative of the switches it will be seen that the connection through switch 17 is closed only when the connection through switch 18 is open and vice versa.

In operation, if the switch 18 of switch sources 13 is closed, and the corresponding switches of switch means 11 and 12 are also closed, the voltage across terminals 6 and 16 will be 6 KV, since there is nothing but in effect a continuous, low-ohm conductor between the negative side of source 7 and terminal 16. However, the control means 30, and/or one or another or both its counterparts in can now be operated to open the corresponding switch and/or switches 18, to provide 8, 10 or 12 KV DC across terminals 6 and 16. Again, such control means can be operated to bring the voltage across terminals 6 and 16 from 12 KV DC to lower levels.

The sources 7 through 10 are shown as having zener diode strings 32 through 35, respectively, thereacross. These strings of zeners have total breakdown voltages suited to the corresponding sources, namely, 6 KV, 2 KV, 2 KV and 2 KV, respectively.

It will be observed that if a source is switched out of the system, at the moment of switching a reverse voltage may be applied to a source, or to sources, still in the system. For instance, if only sources 7 and 8 are contributing to the voltage across terminals 6 and 16, namely, 8 KV, and switching means 11 is operated to take out source 8, there will be, due to capacitor 3, 8 KV instead of 6 KV across the source 7, which would try to cause a reverse current flow through source 7. While, as will be seen later such reverse current can be kept out of the source by means of a blocking diode, the reverse current requires a low-resistance path in order to dissipate any excess energy stored in the load, quickly. Such reverse current finds a low resistance path through zener diode string 32, which breaks down to limit the voltage across it to 6 KV. It will be seen that wherever there is a switch 18 open, there will be a switch 17 closed, thereby connecting the corresponding one of zener diode strings 33, 34 and 35 across such switch 18 and limiting the reverse voltage across it to a value it is rated to withstand.

The diodes 20 and 20A are ordinary diodes, but are also chosen for their zener voltages, each of these being of such value as to breakdown if reverse voltage across the corresponding transistor exceeds the collector emitter breakdown voltage thereof. The total breakdown voltage of the strings of diodes 20 in each of the switches 18 is somewhat higher than that of the corresponding one of zener of diode strings 33, 34 and 35. This is desirable since as compared to a zener diode string, a string of diodes 20 or 20A would provide only a rather high resistance breakdown path, and it is not desirable to rate the ordinary diode string low enough to compete with zener diode string in respect of reverse current flow. If all the transistors of switch 17 or of switch 18 do not turn on simultaneously, the diodes 20 (or 20A, as the case may be) protect the transistors against excess collector-emitter voltage.

The diodes 20 also momentarily provide a return path during switching down. Thus, with respect to reverse current, switches 17 in effect are always open. Thus, even when closed, a switch 17 looks like an open circuit to reverse current at pole 15. However, its diodes 20 at this time present a low impedance path to the reverse current, thereby allowing same access to the corresponding zener string.

Conversely, diodes 20A provide a low impedance path in switches 18 for normal current flow, for example, from pole 55 to pole 15. Thus, even when closed, a switch 18 looks like an open circuit to the normal current at terminal 55, but now the corresponding string of diodes 20A bypasses the current around switch 18. When switch 18 is open, the string of diodes 20A, however, is reverse biased, so normal current flow is through the corresponding source.

In summary, in normal operation, switches 17 of active sources and diodes 20A of inactive sources, and those sources that are active, provide the current path. For reverse current flow, as in switching down, diodes 20 of the active sources and switches 18 of inactive sources, and those zener diode strings, if any, that fire, provide the current path.

In normal operation, as compared to switching up or down, there is substantially no considerable current flow. In switching up or down there is substantial current flow. The problem created by switching down has been dealt with in detail in the foregoing. Insofar as switching up is concerned, it is only necessary to assure that the sources have sufficient surge capacity. In the present example, the ability to deliver about five times or more, depending on the load, the rated current intermittently provides adequate capacity to handle switching up.

It will be observed that fast level changes require the direct current paths collectively established by various transistors and diodes. Though the capacitor 3 is typically but a few hundred picofarads, switching its voltage load down without a direct correct return path would require it to discharge through megohm-scale resistance, and, hence, to take a relatively long time about it, which is undesirable, especially in display systems.

In the illustrated system, it is contemplated that source 7 is always active, whereas any combination of sources 7, 8, and 9, may be switched in or out, in any order. However, if one of those three sources will only be switched in or out while all the rest are active, that one source does not require a string of zeners. For instance, if sources 8, 9, and 10 switch in 1–2–3 order, and out in reverse order, then resistor 47 and string 35 may be eliminated since switch 18 of source 10 provides a return path for discharge of capacitor 3, when source 10 is switched out.

Likewise, if a switch means, say 13, is used alone, i.e., is used in a system wherein there is only the source 10, the zener string 35 and resistance 47 may be eliminated.

In general, any number of sources in series may be switched in accordance with my invention, further, any number of unswitched sources (i.e., like source 7) may be intermixed with the switched sources, in series with them, and finally any switching order may be adopted. Except for the limiting case of one source, or a source that is always last in, but first out, each source, switched or not, would have a zener diode string across it, for the purpose already explained herein.

Various refinements may be provided. For instance, blocking diodes 36 through 39, rated to block voltages somewhat higher than the breakdown voltages of the corresponding zener diode strings, may be provided. Likewise, starter diodes 40 through 43 may be provided to assure that the sources start up properly. Again, the zener diode strings may have current limiting resistors 44 through 47. These expedients, however, are merely illustrative, and form no part of the present invention.

While control means 30 and circuitry 5 have been shown as unrelated entities, normally they will be part of some larger system controlling and coordinating the actions of both. For instance, circuitry 5 may create a luminous trace on face plate 2 graphically depicting conditions in a process. At the same time, control means 5 will operate to vary the voltage across terminals 6 and 16 so as to vary the color of the trace to indicate, by color, qualitative properties of the conditions: high, low, normal, safe, unsafe, and so on. The present invention is particularly adapted to such use as it can provide high voltage switching at very high slewing and repetition rates, under control of quite low-level signals, close to earth potential and well-isolated from the high voltages switched.

The illumination of diodes 25 can of course by provided by means other than the amplifier systems shown, and, at the other extreme, the load on terminals 6 and 16 need not be a phosphor. In essence, the present voltage switching arrangement is useful with any system wherein a reverse current can arise during switching.

The reason for use of the zener diodes and the transistors 21 in strings is due to the fact that at this time none of these elements is available with kilovolt-order ratings. Each such string, however, is in effect a single zener diode or transistor, as the case may be, and, in fact the principles of the invention, as explained, are applicable regardless of whether the source voltages involved can be handled by single diodes and single transistors, or require strings thereof. Insofar as their function of providing for return of current is concerned, the diodes 20 and 20A likewise form strings equivalent to a single diode. Accordingly, in the claims appended hereto, I have referred to diodes and switches in the singular without intending to distinguish between a single transistor, and a string of transistors, or between a single diode and a string of diodes.

Various modifications of the switches will be obvious. For example, optoelectrical switch actuation can be obtained from combinations of radiation sensing and emitting elements other than photo-transistors and photo-emissive diodes. Again, high-voltage color display can be obtained from electroluminescense devices other than so called "beam penetration tubes".

The foregoing refinements, expedients, modifications, etc., are intended as illustrative of the practice of the invention and its utility, not as limitation, as to which reference to the claims appended hereto must be had.

Having described my invention in accordance with the statutes, I claim:

1. A switch means for a voltage switching system, said switch means having a first terminal for connection to one side of a DC voltage source, and a second terminal for connection to the other side of said DC voltage source, and including a first diode and a first switch each connected to said first terminal independently of the other; said first switch being of the type which, when on, is conductive only with respect to current applied to it for passage through it to said first terminal, and said first diode being oppositely polarized with respect to such conduction of said first switch; and said switch means further including a second switch and a second diode each being connected between said terminals independently of the other, said second switch being of the type which, when on, is conductive only with respect to current applied to it for passage through it from said first terminal to said second terminal, said second diode being oppositely polarized with respect to such conduction of said second switch; and said switch means also including a zener diode connected between said second terminal on the one hand, and both said first switch and said first diode on the other hand, said zener diode being polarized with respect to such connection such that upon sufficient current flowing through said first diode from said first terminal, said zener diode breaks down to conduct said current to said second terminal, said zener diode being connected to said first switch such that said first switch is between said zener diode and said first terminal;

said system including control means for, alternately, turning said first switch on and said second switch off, simultaneously, or vice versa.

2. A voltage switching system having the switch means and control means of claim 1, and including, impedance means for utilizing DC voltage between said terminals, a DC voltage source connected across said zener diode independently of the said switches and of the other said diodes;

said zener diode being polarized and rated to withstand the voltage of said source, and said impedance means having the property of being capable of producing a current flowing through said first diode from said first terminal while said first switch is on and said second switch is simultaneously off.

3. The voltage switching system of claim 2, wherein said impedance means is a display panel requiring the voltage of said source for emitting light of a given color.

4. A voltage switching system having the switch means and control means of claim 1, and including a first DC voltage source, a second zener diode, and a second DC voltage source;

said first DC voltage source being connected across said first zener diode independently of the said switches and of the other said diodes, and said first zener diode being polarized to withstand the voltage of said first DC voltage source;

said second DC voltage source being connected at one of its sides to said first terminal for addition of its voltage to the voltage of said first DC source when said first switch and said second switch are simultaneously and respectively on and off, said second DC voltage source also being connected across said second zener diode, and said second zener diode being polarized to withstand the voltage of said second DC voltage source.

5. The voltage switching system of claim 4 having impedance means connected between said second terminal and the other side of said second DC voltage source for utilization of the voltages of said DC voltage sources in series when said first switch and said second switch are simultaneously and respectively on and off; said impedance means having the property of producing a current breaking down said second zener diode if said first and second switches are simultaneously and respectively turned off and on.

6. The voltage switching system of claim 5, wherein said impedance means is a display panel requiring a voltage including that of said first and second DC voltage source in series for emitting light of one color, but, for producing light of a different color, requiring such voltage diminished by the voltage of one of said DC voltage sources.

7. The voltage switching system of claim 4 wherein said second DC voltage source has second switch means, said second switch means being like the first said switch means and connected to said second DC voltage source like said first said switch means is connected to the said first DC voltage source; said second zener diode corresponding to the said first zener diode of said first said switch means.

8. The voltage switching system of claim 7 having impedance means connected between said second terminal, and a terminal, corresponding to said first terminal, of said second switch means, for utilization of the voltages of said DC voltage sources in series when said first switch, and the corresponding switch of said second switch means, are both on and simultaneously, said second switch, and the corresponding switch of such switch means, are both off; said impedance means having the property of producing a current breaking down said second zener diode if said first and second switches are simultaneously and respectively turned off and on, while the corresponding switches of said second switch means are respectively on and off.

9. The voltage switching system of claim 8, wherein said impedance means is a display panel requiring a voltage including that of said first and second DC sources in series for emitting light of one color, but, for producing light of a different color, requiring such voltage diminished by the voltage of one of said DC voltage.

10. Opto-electronically isolated switch means including a first terminal and a first switch for connecting one side of a DC voltage source to said first terminal, said switch means also having a second terminal for direct connection to the other side of said DC voltage source and a second switch interconnecting said first and second terminals;

said first switch being first transistor means and having first diode means, said first transistor means and said first diode means providing return paths for current passing to or from a load impedance in series with voltage across said terminals;

said second switch being second transistor means and having second diode means, said second transistor means and said first diode means providing return paths for current passing to or from a load impedance in series with the voltage across said terminals; each said transistor means having respective photo-sensitive means for turning same on or off depending on the level of illumination of said photo-sensitive means;

and then being control means for controlling illumination of both such photo-sensitive means simultaneously, such that, when the level of illumination with respect to either such photosensitive means suffices to cause the corresponding transistor means to turn on, the level of illumination of the other such photo-sensitive means is insufficient to turn the corresponding transistor means on.

11. A voltage switching system including the opto-electronically isolated switch means of claim 10, said system having a third terminal for connection to one side of a second DC voltage source, the last said one side corresponding to the said one side of the first said DC voltage source;

said system also having zener diode means interconnecting said first and third terminals, said zener diode means being polarized and rated to withstand the voltage of said second DC voltage source, while breaking down for a voltage across said first and third terminals having the polarity of the voltage of said second DC voltage source but being greater in magnitude, the other side of said second DC voltage source being connected to said first terminal.

12. The voltage switching system of claim 11, said system having second switch means, said second switch means being like the first said switch means, and there being second control means for controlling said second switch means like the first said control means controls said first said switch means; and the terminals of said second switch means corresponding to the said first and second terminals, respectively of said first said switch means being effectively and respectively said first terminal and said third terminal.

* * * * *